May 3, 1960 — A. SCHINDEL — 2,935,363

AIR-OIL MIST LUBRICATION

Filed July 28, 1958

INVENTOR.
ARNOLD SCHINDEL
BY
Robert W. Ely
ATTORNEY

2,935,363

AIR-OIL MIST LUBRICATION

Arnold Schindel, Fairlawn, N.J., assignor to Bendix Aviation Corporation, Utica, N.Y., a corporation of Delaware Application July 28, 1958, Serial No. 751,204

7 Claims. (Cl. 308—187)

This invention relates to lubrication of high speed machinery such as an air turbine drive and more particularly concerns an air-oil mist lubrication system for the bearings of such machinery.

An object of the present invention is to provide an improved metered air-oil mist lubrication system for bearings. A further object is to provide such a system in which the lubricating mist is formed with swirling air and the mist is moved axially to the side of a bearing. An additional object is the provision of a mist-lubricating arrangement which has an annular Venturi passage for forming oil mist. Another object is the provision of a compact easily-incorporated arrangement for forming oil mist and moving it axially to the inner sides of two spaced bearings. An additional object is the provision of such an improved mist lubricating system which uses cool air from an air turbine. A further object is to provide a compact oil mist arrangement having an air-swirling, mist-forming annular Venturi passage discharging on the side of a bearing and oil recovery means.

Figure 1:
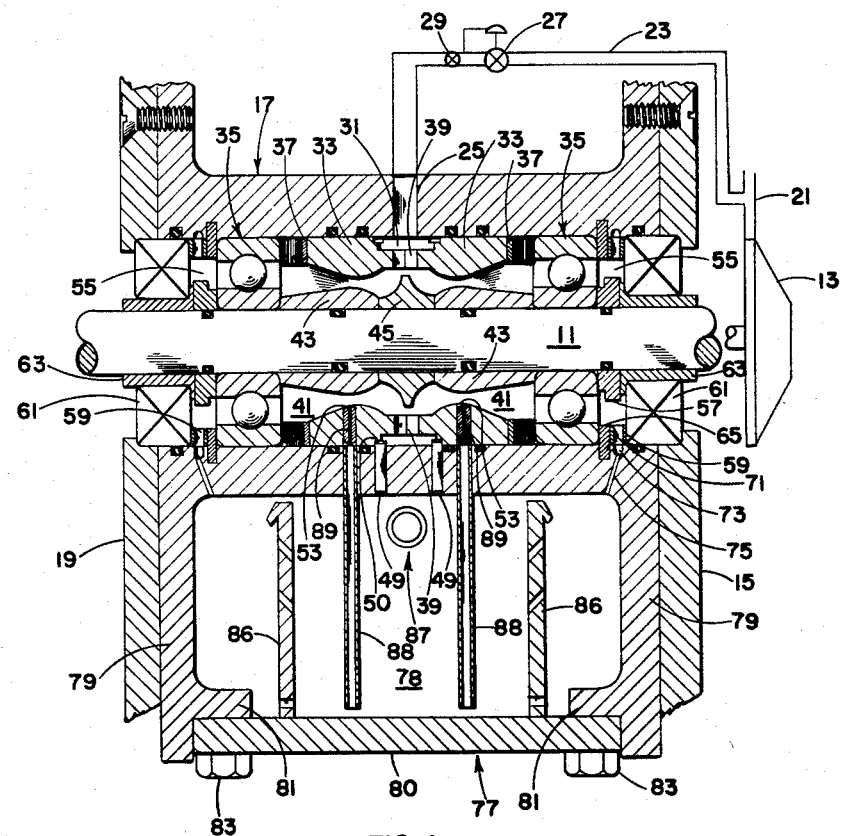
Figure 2:
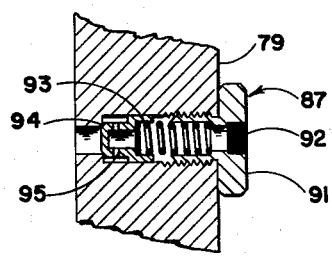

The realization of the above objects along with the features and advantages of the present invention will be apparent from the following description and the accompanying drawing in which:

Fig. 1 is side cross sectional view with parts shown schematically of an embodiment of the invention and shows means for supplying outlet air from a turbine to an annular Venturi passage having a rotating surface where oil from a sump is mixed to form swirling mist which is passed to the bearings and Fig. 2 is an enlarged cross sectional view of the breather valve which is positioned in the wall of the oil sump shown in Fig. 1.

Referring to Fig. 1, an axial shaft 11 has a high speed air turbine 13 (shown schematically) mounted on the right end. An annular segment of the turbine wheel housing 15 is removably attached to the right flange of the bearing housing 17. A compressor wheel or other device can be mounted on the left end of shaft 11. An annular segment of a housing 19 for a compressor wheel is removably attached to the left flange of bearing housing 17. The turbine 13 has an air discharge conduit 21 and a branch conduit 23 connects to mid-point air passage 25 in the top of the annular bearing housing 17. Branch conduit 23 has a pressure regulator 27 and a metering valve 29 (both shown schematically) therein for reducing to a relatively low value (three p.s.i.g.) the pressure of the cool air received from the air turbine or other source and for regulating to a low flow. This air flow is fed radially inward through the radially-extending, centrally-located air passage 25 to an annulus 31 formed by the inner surface of the bearing housing 17 and an annular recess formed by two outer Venturi collars 33.

The two collars or sleeves 33 are assembled between the outer races of the bearings 35 and slidably contact the inner cylindrical surface of the bearing housing 17. Wavy washers 37 at the axial outer ends of collars or sleeves 33 provide biasing action and preload for the bearings. The axially-inner radially-outer parts of sleeves 33 have annular undercuts for forming annulus 31. The axially-inner ends of sleeves 33 also are formed to provide a multiplicity of radial holes 39 for providing access of regulated air to the inlets of the annular Venturi passages 41 which are formed by the inner surfaces of collars 33 and the outer surfaces of inner Venturi sleeves 43 which are mounted on shaft 11. The axially-inner ends of inner sleeves 43 are separated by divertor ring 45 which projects toward the radial air passages 39 as a conical annulus to split and agitate the air flow moving toward the annular Venturi passages 41. Seal rings seal at the junction of sleeves 33 with housing 17 and of sleeves 43 with shaft 11 so that air does not by-pass the annular Venturi passages. Pins 49 are press-fitted in the lower bearing housing 17 and extend into contact with radially-spaced axial slots 50 adjacent the annular undercut at the inner ends of outer sleeves 43 to prevent rotation.

The rolling-element bearings 35 have conventionally-separated balls so that air-oil mist which is formed in Venturi passages 41 by air picking up oil droplets from the outlets of oil passages 53 in the throat section of outer sleeves 33 can pass therethrough to annular chambers 55 outboard of bearings 35. Each chamber 55 is basically formed by face seal wear rings 57 mounted on shaft 11, mist return sleeves 59 on the inner surface of bearing housing 17, and large face seals 61 extending between the bearing housing and a clamping sleeve 63 on the shaft. Lock rings 65 fit into grooves in the bearing housing and are positioned between the outer bearing races and the mist return sleeves 59. Clamping sleeves 63 are axially positioned by the structure (not shown) mounted on the ends of shaft 11 to provide endwise clamping of shaft-mounted elements. Lock rings 65 provide axial positioning of the rotating shaft assembly. Sealing rings at the junction of bearing housing 17 and large face seal 61 and of shaft 11 and wear ring 57 prevent oil or air leakage.

The oil mist from each chamber 55 passes through multiplicity of small radially drilled holes 71 in return sleeve 59 which open into groove 73 of the bearing housing bore. Groove 73 is connected by several diagonally drilled holes 75 to outer parts of the oil sump 77 which formed by a downwardly depending wall 79 of bearing housing 17. Sump 77 is closed by cover 80 attached to an inwardly extending flange 81 of wall 79 by bolts 83.

In sump 77, air-oil mist is separated by two traversely-extending baffles 86 so that oil drops out and air passes out from the inner sump chamber 78 to overboard through air breather 87. Oil is supplied to the Venturi throat by two capillary oil tubes 88 which extend from the bottom of the sump through the bottom wall of housing 17 to the bottom of oil passages 53 in the outer Venturi sleeves 33. The radially drilled passages 53 in the lower part of the sleeves 33 contain capillary pins 89 which are closely fitted to the passages or holes 53. It is to be noted that passages 53 open into the throat of the annular Venturi passages 41. Ring seals provide sealing of oil adjacent the junction of passages 53 and tubes 88.

The air breather 87 at the top of the inner sump chamber 78 is shown in detail in Fig. 2. Hollow plug 91 is threaded into the sump wall 79 and is fitted with a porous disc 92. A spring-biased poppet 93 acts as a check valve, seating against valve seat 94. During operation, air pressure lifts the poppet 93 from seat 94 and air discharges through holes 95 in the hollow poppet 93, plug 91 and the porous disc 92. In operation, expanded cool air from the outlet of the rotating turbine 13 is pressure-regulated by valve 27 and flows through valve 29 to radial passage 25 in the top of bearing housing 17. After passing through the annulus 31 and the radial holes 39 in outer Venturi collars 33, the air divides and swirls over rotating diverter ring 45 and flows through the annular Venturi passages 41. At the annular Venturi throat, the swirling air (due to action of the inner sleeves 43 on rotating shaft) picks up oil from oil passages 53. This oil is atomized by the turbulent air flow and the air-oil mist so produced passes through bearings 35, depositing oil on the races and balls for the lubrication and providing cooling. Oil deposited on the rotating inner race is circulated in the bearing by bearing pumping and centrifugal action. Air and residual oil pass through the bearing and chambers 55 inward of large seals 61 and flow through the holes 71, grooves 73 and passages 75 in the bearing housing to the sump 77. In the sump, oil is deposited by baffle 86 and air moves overboard from inner sump chamber 78 through breather check valve 87 in the sump side wall 79. Oil collected by the baffle action is available for recirculation. Oil is fed to the Venturi throats by the pressure differential between sump pressure and reduced static pressure at the annular Venturi throat and by capillary action of tubes 88 and pins 89 in passages 53 which open to the throat where the oil is picked up and atomized by the swirling air. Oil metering is provided by capillary pins 89 to prevent excess flow of oil.

It is to be understood that persons skilled in the art can make changes in the embodiment of the invention herein disclosed without departing from the invention as set forth in the following claims.

What is claimed is:

1. The bearing lubrication apparatus comprised of a high-speed rotatable shaft, a rolling-element bearing supporting said shaft, means including an annular sleeve mounted on said shaft for rotation therewith forming a Venturi passage arranged to discharge on the side of said bearing, an oil sump, metering oil passage means connecting said sump to the throat of said Venturi passage, air passage means arranged to pass a flow of pressurized air to the inlet of said Venturi passage whereby said sleeve swirls the air which draws oil to and from the throat of the Venturi passage and whereby a turbulent oil mist is discharged on the side of said bearing.

2. The bearing lubrication system comprised of a high speed rotatable shaft, a rolling-element bearing supporting said shaft, a housing encasing said shaft and said bearing, means including an annular sleeve mounted on said shaft for rotation therewith forming a Venturi passage arranged to discharge on the side of said bearing, an oil sump depending from said housing, metering oil passage means connecting said sump to the throat of said Venturi passage, air supply means arranged to provide a flow of pressurized air to the inlet of said Venturi passage whereby said sleeve swirls the air which draws oil to and from the throat of the Venturi passage and whereby a turbulent oil mist is discharged on the side of said bearing.

3. A bearing lubrication system comprised of a bearing housing, a high speed shaft, two spaced rolling-element bearings in said housing supporting said shaft, means extending between the inner sides of said bearings constructed and arranged to provide two annular Venturi passages each having an outlet adjacent the inner side of one of said bearings, said means including two identical collars extending radially-inward from said housing and providing the radially-outer annular surfaces of said annular Venturi passages, said means further including two sleeves mounted on said shaft for rotation therewith and providing the radially-inner surfaces of said annular Venturi passages, each of said collars having a radially-extending oil passage opening into the throat of said Venturi, said housing having oil sump depending therefrom below said means and said bearings, capillary tubes extending from the bottom of said sump to each of said oil passages, return passages in said housing arranged to return fluid from the bottom outer sides of said bearings to the outer sides of said sump, air passage means for passing a flow of pressure-regulated air to the inlets of said Venturi passages.

4. A bearing lubrication system comprised of a bearing housing, a high speed shaft, two spaced rolling-element bearings in said housing supporting said shaft, means extending between the inner sides of said bearings constructed and arranged to provide two annular Venturi passages each having an outlet adjacent the inner side of one of said bearings, a radial air passage in the top part of said housing, said means including two identical collars extending radially-inward from said housing and providing the radially-outer annular surfaces of said annular Venturi passages, the inner ends of said collars providing an annulus and holes which connect said radial air passage to the inlets of said Venturi passages, said means further including two sleeves mounted on said shaft for rotation therewith and providing the radially-inner surfaces of said annular Venturi passages, each of said collars having a radially-extending oil passage opening into the throat of said Venturi passages, said housing having an oil sump depending therefrom below said means and said bearings, oil passage means extending from said sump to each of said oil passages.

5. A bearing lubrication system comprised of a bearing housing, a high speed shaft, two spaced rolling-element bearings in said housing supporting said shaft, means extending between the inner sides of said bearings constructed and arranged to provide two annular Venturi passages each having an outlet adjacent the inner side of one of said bearings, a radial air passage in the top part of said housing, said means including two identical collars extending radially-inward from said housing and providing the radially-outer annular surfaces of said annular Venturi passages, the inner ends of said collars providing an annulus which connects with said radial passage, said means further including two sleeves mounted on said shaft for rotation therewith and providing the radially-inner surfaces of said annular Venturi passages, the inner ends of said sleeves being spaced apart by an annular divertor ring arranged to direct air to the inlets of said two Venturi passages, the inner ends of collars providing equi-spaced passages for passing air uniformly from said annulus toward said divertor ring and to the inlets of said Venturi passages, each of said collars having a radially-extending oil passage opening into the throat of said Venturi passages, said housing having an oil sump depending therefrom below said means and said bearings, capillary tubes extending from the bottom of said sump to each of said oil passages, metering pins in each of said oil passages, return passages in said housing arranged to return fluid from the bottom outer sides of said bearings to the outer sides of said sump, said sump having baffle plates for separating oil mist and providing an inner sump chamber, an air-outlet check valve arranged to vent the top of said inner chamber, air supply means for providing a flow of pressure-regulated cool air to said housing radial air passage.

6. The bearing lubrication apparatus comprised of a high-speed rotatable shaft, a rolling-element bearing supporting said shaft, means including an annular sleeve mounted on said shaft for rotation therewith forming a Venturi passage arranged to discharge on the side of said bearing, an oil sump, metering oil passage means connecting said sump to the throat of said Venturi passage, air passage means arranged to pass a flow of pressurized air to the inlet of said Venturi passage whereby said sleeve swirls the air which draws oil to and from the throat of the Venturi passage and whereby a turbulent oil mist is discharged on the side of said bearing, collecting means arranged to direct oil mist from said bearing to said sump, said sump having baffle means to separate air from oil mist and a check valve arranged to release separated air from said sump.

7. The bearing lubrication system comprised of a high speed rotatable shaft, a rolling-element bearing supporting said shaft, a housing encasing said shaft and said bearing, means including an annular sleeve mounted on said shaft for rotation therewith forming a Venturi passage arranged to discharge on the side of said bearing, an oil sump depending from said housing, metering oil passage means connecting said sump to the throat of said Venturi passage, air supply means arranged to provide a flow of pressurized air to the inlet of said Venturi passage whereby said sleeve swirls the air which draws oil to and from the throat of the Venturi passage and whereby a turbulent oil mist is discharged on the side of said bearing, said air supply means including an air turbine mounted on said shaft with the turbine outlet providing cool air, collecting means arranged to direct oil mist from said bearing to said sump, said sump having baffle means to separate air from oil mist and a check valve arranged to release separated air from said sump.

References Cited in the file of this patent

UNITED STATES PATENTS 2,762,664      Manning et al.  _____ Sept. 11, 1956